United States Patent

Krebs et al.

[15] 3,652,965

[45] Mar. 28, 1972

[54] RESILIENT MAGNETIC COUPLING

[72] Inventors: Frederick G. Krebs, Dayton, Ohio; Samuel A. Redman, Garden City, N.Y.

[73] Assignee: The National Cash Register Company, Dayton, Ohio

[22] Filed: Oct. 6, 1969

[21] Appl. No.: 863,812

[52] U.S. Cl............................335/277, 335/270, 335/303
[51] Int. Cl............................................H01f 1/00
[58] Field of Search......................335/271, 277, 278, 303

[56] References Cited

UNITED STATES PATENTS 3,198,996   8/1965   Vollprecht............................335/271
2,532,876   12/1960  Asche et al..........................335/303

FOREIGN PATENTS OR APPLICATIONS 1,157,706   11/1963  Germany..............................335/270

OTHER PUBLICATIONS

Goretzki et al., Magnet, IBM Technical Disclosure Bull. Vol. 9 No. 4, Sept. 1966, page 392

Primary Examiner—Bernard A. Gilheany
Assistant Examiner—F. E. Bell
Attorney—Louis A. Kline and John J. Callahan

[57] ABSTRACT

An elastic coupling made from moldable curable material having both magnetic permeability and desirable mechanical properties, including resilience, flexure tolerance, and large-area contact with metallic members, is disclosed. Application of the coupling in a bonded junction between lightweight fast-acting fatigue-stress-susceptible members which are connected between acceleratable masses in a magnetic-solenoid-excited data-processing peripheral is shown.

22 Claims, 3 Drawing Figures

PATENTED MAR 28 1972

3,652,965

WITNESS

G. B. Hollins

INVENTORS
FREDERICK G. KREBS &
SAMUEL A. REDMAN

Louis A. Kline
BY
John J. Callahan

THEIR ATTORNEYS

RESILIENT MAGNETIC COUPLING

BACKGROUND OF THE INVENTION

1. Field of the Invention

This invention pertains to the art of resilient couplings formed with viscous hardenable material in an environment similar to a static mold.

The invention further pertains to resilient couplings between accelerated and highly loaded structure members which are portions of a magnetic circuit.

The invention further pertains to a structure and a method for resilient attachment of a solenoid armature to the solenoid-driven load member in a high-speed printer mechanism.

2. Description of the Prior Art

In the prior art, it is known to impregnate a rubber with magnetic material for the purpose of making magnetic rubber articles such as rubber bands, conveyor belts, refrigerator door gaskets, and artificial muscles. In those prior art materials, the use of various magnetic substances such as finely divided metallic iron, iron oxides, and nickel compounds is disclosed.

In the present invention, a particular family of resilient materials having magnetic particle impregnation is used for providing a unique coupling and joining together of structural members which are also part of a magnetic circuit.

SUMMARY

The present invention discloses the use of an impregnated hardenable viscous material as a resilient coupling medium between two portions of a magnetic circuit. The invention relates to the structure resulting from use of the resilient magnetic coupling as well as to the method of fabricating the coupling.

The invention provides a flexible coupling which reduces the total moving mass required in a solenoid magnetic circuit by permitting part of the required magnetic flux to flow in structure members which are already present in the mechanism for structural purposes but are physically separated from the magnetic circuit by the resilient coupling. Long operating life is provided for structural members that connect a load mass to the mass of a magnetic exciting apparatus, because of the flexible coupling's ability to limit acceleration-induced degradation in the structural members.

The invention discloses composition of one material for the flexible coupling and fabrication techniques for the coupling which are based on use of this material.

DESCRIPTION OF THE PREFERRED EMBODIMENT

Figure 1:
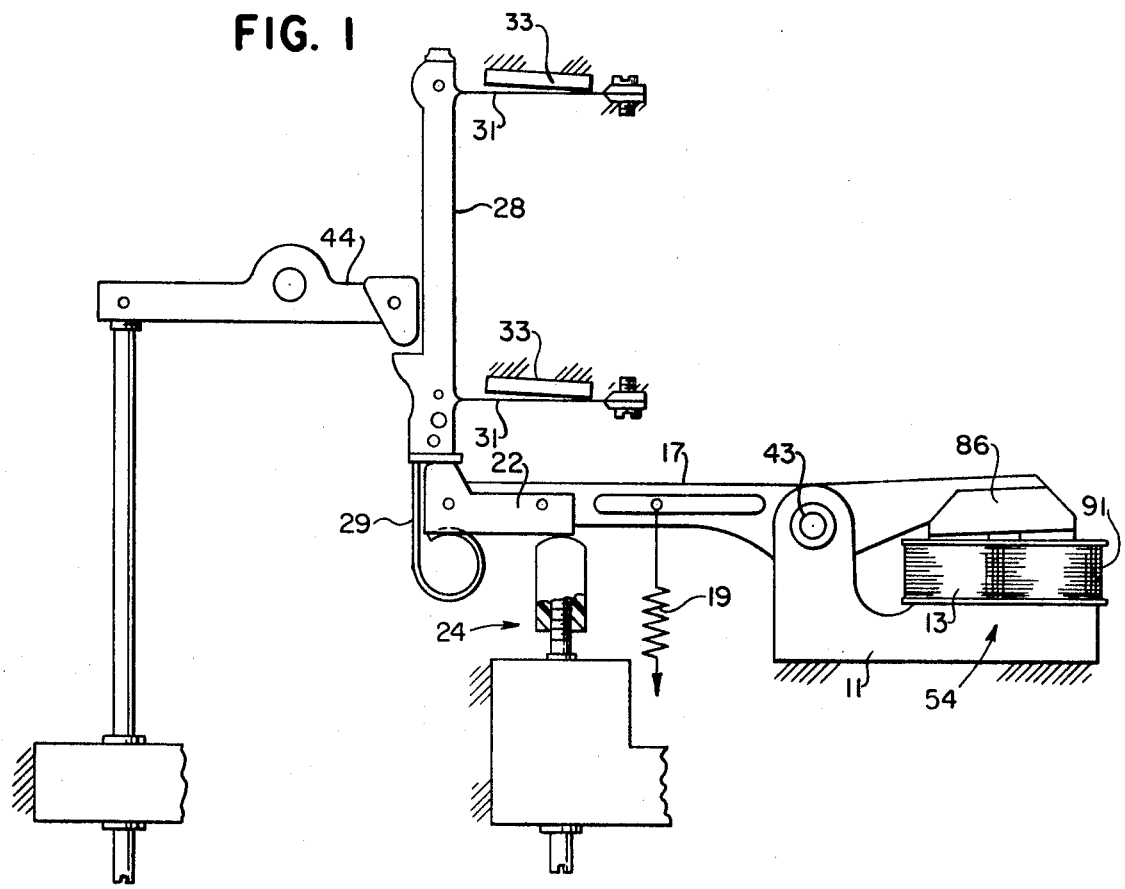
FIG. 1 of the drawing is an overall view of a solenoid and load constructed according to the present invention.

As the operating speed and kinetic energy levels increase in an impact mechanism, it requires increasing design skill and diligence to prevent portions of the mechanism from oscillating in an undesirable and destructive mode upon receiving a change in velocity; in addition, as the relative velocity between impacting members in a mechanism is increased and the physical size of the impacting members is decreased, it is clear that the operating life of the mechanism members will greatly depend upon the ingenuity with which the stresses attending the shock of impact and the oscillations attending the change of member velocity at impact can be controlled and can be dissipated without harmful effects. Ultimately, the fatigue-sustaining ability of the materials used in the mechanism limit the degree to which mechanism member size may be reduced while increasing member impact velocity and the kinetic energy operating level. Through careful shaping of members and through the use of resilient materials as disclosed in the present description, it is possible to obtain surprising performance in computer peripheral mechanisms before fatigue-sustaining ability of the mechanism materials imposes a performance limitation. Judicious use of resilient and energy-absorbing materials in essence delays onset of the fatigue limitation in a mechanism.

Probably no part of the mechanism design art has greater need for delaying the onset of fatigue limitations than does the high-speed impact printing mechanism field. Need for faster printing and better-quality printed images on a large number of printed copies places the operating energy level of a print hammer near 200,000 ergs in a printing cycle occurring in less than 15 milliseconds in a state of the art printer mechanism. The need for materials and for fastening techniques that provide a print hammer capable of operating at this velocity without fatigue limitation has been met. In the present invention, need for coupling techniques and materials that will delay the onset of fatigue limitations in parts of the mechanism which mate with a print hammer and which transduce energy from electrical to magnetic and to kinetic form is addressed. It has been found that fatigue limitations in these ancillary parts of the mechanism are often more severe than are the comparable problems in the hammer itself, since there is less flexibility as to the choice of materials to be used and since energy dissipation is more critical; that is, all energy devoted to movement in these mechanism parts external to the hammer is considered wasted in so far as performing useful work is considered.

Although the present invention is described in terms of a high-speed printer, it is not intended that it be restricted to this art; other classes of data-processing terminals have equal needs for high-energy long-life magnetic mechanisms. Also, the invention disclosed herein may also be utilized to advantage in mechanisms completely foreign to the data-processing terminal art.

FIG. 1 of the drawing shows the important parts of a high-speed impact printing mechanism which utilizes the present invention.

The parts shown in FIG. 1 are identified as an impact printing hammer 28; a pair of cantilever flexure springs 31 used to mount the printing hammer 28; a cantilever spring stop member 33; a hammer penetration control stop member 44; a hammer return spring member 29; a hammer backstop and position-locating assembly 24; a hammer backstop engaging spring 19; a hammer-actuating impact arm (or solenoid armature arm or hammer-actuating member) 17; an impact arm impacting face member 22; and an exciting solenoid assembly or device 54, which includes as members a solenoid yoke portion or yoke member 11, having mounted upon it electrical windings 13 and 91, a pivot 43, and a movable solenoid armature member 86.

Figure 2:
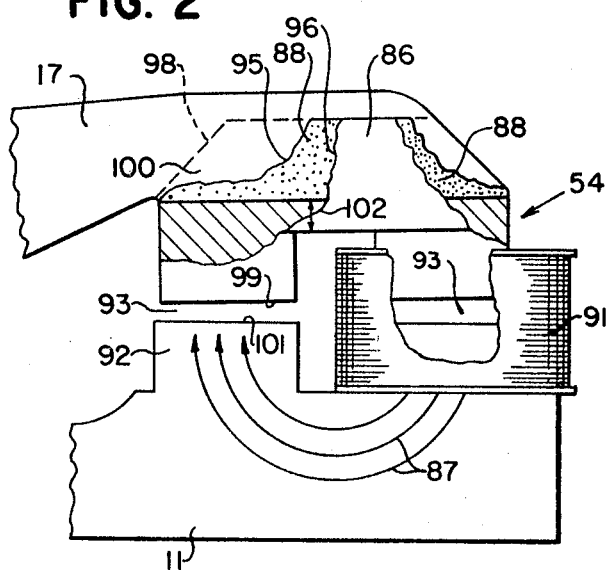
FIG. 2 of the drawing is a cutaway view of an electrical solenoid which employs a resilient coupling of the type disclosed in the present invention.
Figure 2A:
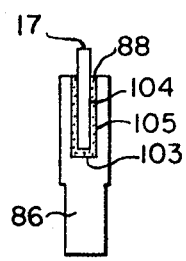
FIG. 2A of the drawing is an end view of the armature portion of the solenoid shown in FIG. 2.

FIGS. 2 and 2A of the drawing show a detailed and cutaway view of the exciting solenoid assembly 54 of FIG. 1. In FIG. 2, both the solenoid armature arm 17 and the solenoid yoke portion 11 are shown cut away at a point close to the pivot 43. Other details of the solenoid assembly 54 are described in later portions of this specification in connection with disclosing details of the invention.

In the printer mechanism of FIGS. 1 and 2, the solenoid yoke portion 11 is shown to be large in physical size and massive in construction; since this member of the mechanism is stationarily mounted on the printer frame, the necessity of a large mass here for conducting the magnetic flux developed by the windings 13 and 91 is no limitation on the mechanism's operating speed. The solenoid armature member 86 in FIGS. 1, 2, and 2A is also large in size and massive in construction, since it too must conduct the magnetic flux generated by the windings 13 and 91 during operation of the mechanism. Since the armature member 86 is a movable part of the mechanism and must be accelerated and decelerated during each cycle of printer operation and is a mass located relatively far from the axis of rotation at the pivot 43, the armature's contribution to the moment of inertia of the printing mechanism movable members is significant. In order that the armature 86 contribute as little mass and moment of inertia to the printing mechanism as possible, it is desirable to minimize the amount of material which it contains. In the following paragraphs, the factors which limit this minimizing of armature material are discussed, and an improved technique for minimizing armature mass is disclosed.

In FIGS. 1 and 2, in contrast to the relatively large and heavy construction employed for the solenoid yoke portion 11 and the armature member 86, the solenoid armature arm 17, which delivers kinetic energy from the solenoid armature 86 to the printing mechanism, is relatively thin and, in the portion between the pivot 43 and the hammer 28, almost spindly in appearance. This construction is, of course, an extension of the effort to remove mass and inertia from the printing mechanism. Curtailment of the amount of material employed in the portion of the solenoid armature arm 17 between the pivot 43 and the point of contact with the hammer 28 is especially important, since the distance between these two points is relatively large, and the moment of inertia contribution of any mass located so far out on the arm is thereby made large. (The moment of inertia of a mass is proportional to the square of its distance from the axis of rotation.)

Because they are necessarily made slender and as light as possible, solenoid armature arms, such as 17 in the FIGS. 1 and 2 embodiment of a high-speed printer, are the frequent site for material fatigue limitations to be encountered in printing mechanism design. Since the mechanism designer must provide for long operating life of the mechanism members despite the possibility of fatigue failure in mechanism materials, he is usually faced with the alternatives of (1) increasing the amount of material in the armature arm, an election which increases the unproductive mass which must be accelerated and decelerated during each operating cycle and which thereby either increases the energy-dissipating requirements of the printer or increases the time of a printer-operating cycle, or (2) decreasing the stress induced into the armature arm of a given size and weight, so that fatigue failure does not occur within the desired operating life. Decreasing stress induced into the armature arm has, in the past, entailed decreasing the operating speed and the operating energy level of the printer.

The solenoid armature arm 17 in the FIG. 1 embodiment of a printing mechanism was susceptible to catastrophic mechanical failure from a fatigue fracture developing after a few million operations. In the FIG. 1 design, invariably this fracture commences in the corner region wherein the solenoid armature arm 17 and the mass of the solenoid armature member 86 are joined into a single assembly in conventional mechanism designs. The use of fillets is effective to move the point of commencement for this failure away from the extreme corner between the members 17 and 86; however, failure invariably commences somewhere in the region associated with the corner even when the best conceivable fillet design is employed.

Conventional configurations for the solenoid armature arm 17 and its connection with the armature 86 call for joining the armature member 86 and the armature arm 17 by brazing or welding or some other mechanical attachment. In essence, these attachments cause the two members 17 and 86 to behave as a single structure, a structure which has weakness toward fatigue failure at the point where its two composite members, one rigid and massive and one flexible and spindly, are joined.

In lieu of joining the two members 17 and 86 in a rigid and nonyielding manner, as is the prior art in high-speed printer design, it has been found that joining them by a nonrigid resilient coupling permits action as separate and individual structures which have isolation great enough to avoid the flexure and oscillations which would otherwise occur in the more flexible member at a point near the member junction. In essence, with the resilient joining technique, the members may be regarded as separate and independent of each other despite their being coupled closely enough to permit transmitting energy from the solenoid assembly 54 to the printer members. In practice, the resilient coupling between members may be tailored to have sufficient rigidity for efficient transmission of the relatively large motion induced by exciting the solenoid assembly 54, yet have sufficient flexibility to yield under the high-magnitude forces induced by impact acceleration and deceleration of the two masses. Without resilient coupling, the relatively large mass of the solenoid armature member 86 joins with the resilience in the arm 17 to oscillate at some natural frequency upon sudden change of their velocity by an impact; this oscillation produces rapid flexing of the arm 17 at each impact event, whether the impact occurs at the solenoid end of the arm 17 or at its hammer end. With the resilient coupling present in the system, and used to connect a large part of the inertia load to the system, the energy represented by this oscillatory motion can be dissipated without undue flexing of the arm 17.

In addition to considering the oscillatory flexure which impact tends to induce into the arm 17, it it possible to better understand the loading to which the arm 17 is subjected with the conventional fastening technique by considering the arm and armature members 17 and 86 from another viewpoint. If the arm 17 and the armature member 86 are rigidly fastened together, it is clear that, within the confines of the massive armature member 86, a structure having great rigidity to deflection is formed; that is, in lieu of the arm 17 flexing under load within this armature area of high rigidity, the arm 17 will, when impact loaded, flex in the closest region of decreased rigidity, or in the region where the armature 86 and the armature arm 17 meet. In operation of the mechanism, it has been found that this continual flexing concentrated into a small region very rapidly produces fatigue weakening and failure of the material in the arm 17, usually within a few million hammer operations.

With the resilient coupling between the armature member 86 and the arm 17, flexibility of the arm 17 is maintained throughout its length without diminishment, by attachment of the rigid massive armature member 86; hence, the arm 17 is capable of gradual deflection under load without encountering a region of abrupt change from no deflection to substantial deflection. This gradual deflection under load can be easily maintained within the elastic limit of the material of the arm 17 with good design practice, so that failure tendency near the point of abrupt change of rigidity is eliminated.

In both the oscillating mass viewpoint and the gradual arm deflecting viewpoint of the resilient coupling, the resilient coupling material 88 which is added in accordance with the present invention between the armature member 86 and the arm 17 may be considered as a means for isolating two members of the composite structure from each other to a desirable degree. Isolation between members in addition to the above effects has, from a mathematical viewpoint, the effect of reducing the structural body, to which the well-known expression for flexural stress ($S = Mc/I$) applies. The isolation of the resilient coupling material 88 reduces the effective structural entity from a composite structure having both the arm 17 and the armature member 86 as components to simply the individual parts, arm and armature.

Another advantage to be gained from the resilient coupling between the armature 86 and the armature arm 17 in the FIGS. 1 and 2 printing mechanism lies in the lack of perfect resilience in the coupling material 88; since the coupling material, when exercised through a stretch-and-rebound cycle during operation of the printing mechanism, does not return to the mechanism all of the energy which it absorbs, an energy-dissipating device is made available for utilization in the printing mechanism. This energy-dissipating device is effective in curtailing the duration and the severity of the previously mentioned impact-induced oscillations in the armature-armature-arm pair 86–17.

Yet another advantage to be gained from the resilient coupling between the armature 86 and the armature arm 17 lies in the ability of the resilient coupling material 88 to transmit large forces into the fragile armature arm 17 without inducing stress concentrations into the armature arm at the point of attachment between the armature and the armature arm. Transmission of large forces into a small area of the arm 17 has also been found to be destructive to the material used in the arm 17.

Although the problems encountered in designing a fast-acting solenoid-excited mechanism are explained in terms of the printing mechanism shown in FIGS. 1 and 2, and the present invention is applied to the FIGS. 1 and 2 mechanism, the behavior of the mechanism members is common to all high-speed impact printers and to the general class of mechanisms which achieve rapid operation through careful restriction of the amount of material employed in the fabrication of moving parts.

FIG. 2 of the drawing shows a cutaway view of the technique employed to accomplish the resilient coupling of the two members 17 and 86. FIG. 2A shows an end view of the armature structure shown in FIG. 2 and especially shows in detail the slot which is cut into the armature member 86 for arm attachment purposes; FIG. 2 shows in detail the configuration of the members within the slot. In FIG. 2, the line 96 represents a cutting away of the armature member 86, so that the interior construction of the resilient coupling may be observed. In the FIG. 2 view of the resilient coupling, the material 88 comprises elastic resilient media used to join the two parts 17 and 86. This material is in turn cut away by the line 95 to reveal the solenoid armature arm 17 as it exists inside the elastic coupling. The dotted line 98 shows the normal extent of the solenoid armature member 86 onto the solenoid armature arm 17. As indicated in the FIGS. 2 and 2A embodiments, the resilient coupling material 88 completely surrounds the solenoid armature arm 17 and provides the sole means for force transmittal from the solenoid armature member 86 to the armature arm 17; in the configuration of FIGS. 1 and 2, force is transmitted through the resilient coupling primarily by shear stresses in the coupling.

It has been found in practice that a thickness near 0.015 inch is satisfactory for the resilient material 88, as shown in FIGS. 2 and 2A.

For fabricating the resilient coupling shown in FIGS. 2 and 2A, a sequence of steps such as those described below has been found satisfactory:

1. Roughen the surfaces to be joined by the resilient coupling material 88, surfaces 100 and 103 in FIGS. 2 and 2A, respectively. Roughening may be accomplished by a grit sandblast operation capable of producing a minimum surface of 30 microinches.

Following the sandblast roughening operation, it has been found desirable to wait no more than 72 hours before bonding to the roughened surfaces, in order that oxide not form on them.

2. Clean the roughened surfaces by use of a trichloroethylene or similar cleaning process.

3. Immediately following the cleaning process, paint the surfaces 100 and 103 with a thin solution of commonly available rubber-to-metal bonding cement, so that a uniform cement thickness not exceeding 0.002 inch is obtained. In FIG. 2A, interfaces at 104 and 105 are composed of the bonding cement. A bonding cement such as Thixon AM-2, manufactured by Dayton Chemical Laboratories, Incorporated, West Alexandria, Ohio, United States of America has been found suitable for this purpose in the present embodiment. "Thixon" is a trademark of the foregoing company. Following this painting with thermal bonding cement, it has been found desirable to wait at least 2 hours but not more than 48 hours to perform the molding operation, in order that the cement solvent have adequate time to dissipate while yet insuring usage of active bonding cement.

4. Place the metal parts 17 and 86 in a molding die which has been pre-heated to about 320° Fahrenheit.

5. Employing a molding press of the transfer molding variety, inject the moldable material into the space between the members 17 and 86. During the molding, it has been found desirable to maintain a platen temperature of 320° to 340° Fahrenheit and to apply total pressures near 75 tons in magnitude and to mold for a period of 10 minutes in order that the injected material cure from the viscous state to the hardened state in the molding press. These values have been found desirable when a 10-cavity molding die is employed. Variations may occur with other equipment, as will be apparent to a person skilled in the art.

6. Remove excess molding material which has extended beyond the limits of the solenoid armature member 86.

The moldable material or resilient coupling material 88 used in the above fabricating process in the FIGS. 1 and 2 embodiment of the invention may be an acrylonitrile butadiene rubber or, as it is more commonly referred to, a nitryl rubber NBR polymer; this particular material is curable to the state of a hard rubber, having hardness measure near 80 on the Shore A Durometer scale. When the material contains the dispersed oxide filler, as described below, it has a hardness near 95 on the Shore A scale, or about 40 on the Shore D scale. A nitryl rubber material found satisfactory for the embodiment of the invention shown in FIGS. 1 and 2 of the drawings is designated Hycar NBR Polymer by its manufacture, B. F. Goodrich Chemical Company. "Hycar" is a trademark of the foregoing company.

Although the illustrated embodiment of the invention contemplates use of the indicated NBR Polymer and use of the aforementioned rubber-to-metal bonding cement, it is intended that the invention not be limited to either of these specific materials; it is also possible, in some embodiments, for the bonding cement to be eliminated entirely.

In FIG. 2, the curved arrow lines 87 designates a portion of the circular path which is followed by the magnetic flux induced into the solenoid by the electrical windings 13 and 91; the curved arrow lines 87 designate the part of this circular path which lies within the yoke portion 11. The complete circular path followed by the flux from the windings 13 and 91 embraces the curved arrow part 87, the two air gaps 93, and the armature 86. Flux is minimized in the yoke portion containing the pivot 43 by polarizing the windings 13 and 91 to have a North magnetic pole at the top of one winding and at the bottom of the other winding. (If both windings had a North magnetic pole at their top, the resulting flux would flow in the yoke portion containing the pivot 43.)

Earlier in this specification, the compromises between mechanism operating life and mechanism operating speed and the material fatigue problem were mentioned, and the desirability of reducing the amount of mass and the moment of inertia of that mass, in order that desirable operating speeds be obtained in the printing mechanism of FIGS. 1 and 2, was mentioned. In considering the flux-carrying capability of the armature 86, an interplay which again involves low mass with the resulting fast mechanism operation and large mass with desirable flux-carrying properties but slow operation is found to exist.

In the mechanism shown in FIGS. 1 and 2, as well as in all magnetically actuated high-speed mechanisms, the interplay between low mass and desirable magnetic flux-carrying properties suggests that every portion of the solenoid armature be examined for its necessity for either structural purposes or magnetic purposes and that armature portions not justified for one of these needs be removed in order that mass to be accelerated be reduced and operating speed of the mechanism thereby increased. In similar fashion, it is often justifiable to exercise a great degree of innovation and cleverness in armature design in order that portions within the armature assembly serve in both structural and magnetic capacity andthereby reduce the mass which must be devoted to each need separately.

These guidelines are followed in designing the armature 86 in FIGS. 1 and 2. In the armature 86, the magnetic flux is called upon to traverse a region 102 as a part of the earlier-described circular path; the region 102 is purposely made small in cross section in the FIGS. 1 and 2 mechanism in order that mass be removed from the armature 86 and operating speed of the mechanism be enhanced.

Since the region 102 is the smallest cross-sectional area which must be threaded by the flux flowing along the described circular path, it acts as a limitation upon the quantity of flux which can flow in the circular path. This flux limitation can be significant in determining the maximum force generatable by the coils 13 and 91 of the solenoid assembly 54, and in turn determining the maximum closure force and operating speed of the overall printer hammer assembly. Several alternatives may be pursued in order that this flux limitation be circumvented. One such alternative would involve the use of an armature member which provides a larger cross-sectional area at 102; such an armature member would be greater in overall height and would have greatly increased mass over the FIG. 2 armature member, however. Since fast operation of the printer mechanism dictates that the solenoid assembly 54 have the lowest possible moving mass, it is desirable to avoid this larger armature solution to the restricted region 102 in favor of a solution which utilizes iron material already present in the mechanism for structural purposes.

A better solution to the quantity of flux limitation at 102 is to permit magnetic flux to flow into the armature arm 17, so that a path shunting the region 102 is afforded by iron material which is already part of the solenoid assembly. In order to accomplish this and permit the armature arm 17 to be an actual and effective part of the magnetic path, it is necessary that a low reluctance flux path through the arm 17 be generated and that this new flux path have a total reluctance comparable to that of the primary path through the restricted region 102. In order to form a flux path of such low reluctance, it is necessary to restrict the nonmagnetic material encountered by the flux in traversing the new path to a minimal level; this may be accomplished satisfactorily in some embodiments by allowing the resilient coupling material 88 to be very thin, so as to provide a minimal nonmagnetic gap in series with the new path; however, such a possibility is undesirable in the illustrated embodiment in order that useful mechanical properties of resilience and shear resistance be retained by the resilient coupling. Another method for accomplishing this small amount of nonmagnetic material in the flux path is to provide for the resilient coupling material 88 to be itself possessed of magnetic properties. One way in which magnetic properties may be achieved within the resilient coupling is through dispersing magnetically conductive particles in the otherwise nonmagnetic resilient material. For this purpose, iron oxide particles have been found satisfactory. In practice, an iron oxide which consists of particles of $Fe_3O_4$ magnetic oxide has been found particularly satisfactory for this use. In the present embodiment of the resilient coupling invention, the magnetic retentivity and coercive force properties of $Fe_3O_4$ iron oxide provide desirable operating characteristics for the magnetic circuit. It is conceivable that other embodiments of a printer and other applications of the resilient magnetic coupling could make use of the differing magnetic properties of other oxides of iron such as $Fe_2O_3$ or of finely divided metallic magnetic material such as iron or of ferrite for dispersion into the resilient coupling material. It is clear that a different degree of residual magnetism or magnetic bias could be provided for the magnetic circuit if one of the materials commonly employed in coating magnetic tapes and magnetic discs was employed as the material dispersed into the resilient coupling material.

In the present embodiment of the invention, it has been found that a form of $Fe_3O_4$ iron oxide which is classified as Ferroso-Ferric Oxide and designated as MO-4230 by its manufacturer, Pfizer Minerals Pigments and Metals Division, gives satisfactory performance in the resilient coupling. The MO-4230 form of $Fe_3O_4$ has an acicular or needle-shaped particle having a length of 0.55 micron and a width of 0.08 micron; the small size of this particle and its approach to the size of a single domain are believed notable in determining the magnetic properties in the preferred embodiment of the resilient coupling. The manufacture lists magnetic properties of the MO-4230 material as follows:

Coercive Force (Mc)—305 to 335 Oersteds
Residual flux density—2,000 to 2,300 gauss
Saturation flux density (Bm)—3,900 to 4,200 gauss It has been found that dispersing the $Fe_3O_4$ material into the nitrile rubber material in the ratio of 50 parts iron oxide by weight to 50 parts rubber material by weight produces a satisfactory combination of magnetic and resilient properties for the resilient coupling. For the solenoid structure shown in FIGS. 1 and 2 of the drawing, the total amount of iron oxide employed is about 90 milligrams, and the total amount of NBR elastomer is also about 90 milligrams. In the solenoid of FIGS. 1 and 2, this 180-milligrams of material is placed in an armature slot which is approximately seven thirty-seconds of an inch in depth and twenty-nine thirty-seconds of an inch long; the solenoid armature arm 17 in FIG. 2A is approximately 0.040 of an inch in thickness; the overall slot width is approximately 0.070 of an inch; and the resilient material is about 0.015 of an inch in thickness on all sides of the armature arm 17.

Dispersion of the $Fe_3O_4$ powder into the elastomeric NBR material in the FIGS. 1 and 2 embodiment of the invention has been found to be conveniently accomplished while the NBR is in a viscous state and is processed on a rolling mill. In dispersing the iron oxide material into the viscous NBR material on the rolling mill, it has been found advantageous to employ a wetting agent, such as a sodium alkyl sulfate complex powder, to assist in quickly and uniformly spreading the magnetic material into the NBR elastomer.

It is clear that other concentrations of magnetic material could be used in the resilient coupling and yet fall within the scope of this invention. The only restrictions imposed upon the concentration of magnetic material within the coupling is that the elastomeric material not be so heavily loaded with magnetic particles as to lose its desirable properties of resilience, flexure tolerance, and shear resistance on the one hand and that the composite magnetic-resilient material have sufficient magnetic properties to be useful in transmitting flux on the other hand. It is also clear that a homogeneous resilient magnetic material which does not depend upon the dispersion of particles but inherently has both resilient and magnetic properties could be employed in the magnetic coupling if such a material is found.

In practice, it has been found that the use of the elastomeric resilient coupling described in this specification removes one of the most critical limitations to hammer-operating speed and reasonable operating life in a high-speed impact printer mechanism; it has also been found that operating speed of the mechanism can be increased and operating power in the mechanism reduced, while retaining the benefits of the resilient coupling, by adding magnetic properties to the resilient coupling, so that parts of the structural members may participate in conducting magnetic flux and may thereby reduce the total mass to be accelerated during each operating cycle.

Although the present invention is disclosed in terms of a resilient coupling for use with a solenoid for a high-speed printer mechanism, it is intended that such embodiment be but typical of environments in which resilient couplings may be applied.

It is apparent that both the coupling described and the method of fabricating the coupling are applicable as a general means of connecting two members of a magnetic circuit which are subject to impact or other high acceleration loading.

It is also apparent that a resilient magnetic coupling such as that described herein may also be applied in such mechanisms as electromechanical relays, electromagnetic clutches and brakes, and magnetic transducers, and in any similar mechanisms wherein magnetic flux and mechanical movement are present.

We claim:
1. A magnetic solenoid device comprising:
a magnetic yoke member;
an electrical coil magnetically coupled with said magnetic yoke member;
a movable magnetic armature member having a cutaway region therein, said cutaway region being of such dimensions as to intercept a portion of the magnetic flux set up within said armature member during actuation of said solenoid device;
a movable connecting member of magnetic material for transferring kinetic energy between said armature member and a mass-possessing load member, said connecting member having an attachable end portion of a shape and size which mates with said cutaway region of said armature member; and
resilient organic coupling material having a thin cross-sectional shape located between said attachable end portion of said connecting member and said cutaway region of said armature member and bonded thereto,
whereby said armature member and said connecting member are joined in a nonrigid and resilient manner permitting magnetic flux usually conducted by said armature member to be partly conducted by the portion of said connecting member which mates with said armature member, thereby producing a magnetic solenoid device of reduced mass and resistant to flexural failure.

2. A magnetic solenoid device as in claim 1 wherein said resilient organic coupling material is composed of a material having magnetic permeability greater than air.

3. A magnetic solenoid device as in claim 2 wherein said resilient organic coupling material contains particles of high-permeability magnetic material dispersed therein.

4. A magnetic solenoid device as in claim 3 wherein said particles of high-permeability magnetic material are iron oxide particles.

5. A magnetic solenoid device as in claim 4 wherein said particles of iron oxide are particles of $Fe_3O_4$ magnetite iron oxide.

6. A magnetic solenoid device as in claim 5 wherein said particles of $Fe_3O_4$ have an acicular shape with a length less than 1 micron.

7. A magnetic solenoid device as in claim 6 wherein said resilient organic coupling material having particles of $Fe_3O_4$ iron oxide dispersed therein is composed of a rubber material.

8. A magnetic solenoid device as in claim 7 wherein said rubber coupling material is an acrylonitrile butadiene rubber.

9. A magnetic solenoid device as in claim 8 wherein said acrylonitrile butadiene rubber coupling material is a flowable rubber compound having a hardness near 95 on the Shore A durometer scale after said particles of $Fe_3O_4$ iron oxide are dispersed therein and curing is accomplished.

10. A magnetic solenoid device as in claim 9 wherein said particles of $Fe_3O_4$ iron oxide are dispersed into said acrylonitrile butadiene rubber coupling material in proportions near 50 parts by weight of iron oxide to 50 parts by weight of rubber.

11. An impact-excited high-speed mechanism comprising:
a stationarily mounted magnetically conductive yoke member;
an electrical exciting coil having electrical windings for conducting exciting current and introducing magnetic flux into said yoke member;
a magnetically conductive solenoid armature output member which is movable between a home and an energized position and is matable with said yoke member;
an inertia-possessing load member; and
a resilient coupling for nonrigidly joining said solenoid armature output member and said inertia-possessing load member, comprising:
a nonmetallic elastomeric body portion physically located between said solenoid armature output member and said load member and having large contact surface with each of said members so as to distribute coupling stresses over an area of said members,
a first bonding interface having on one side thereof said load member and on the other side thereof material having affinity for said elastomeric body portion, and
a second bonding interface having on one side thereof said solenoid armature output member and on the other side thereof material having affinity for said elastomeric body portion,
whereby said resilient coupling permits rapid and high acceleration operation of said mechanism with decreased member flexure and deformation so as to increase operating life of said mechanisms.

12. An impact-excited high-speed mechanism as in claim 11 wherein
said inertia-possessing load member is composed of magnetic flux conductive ferromagnetic material and
said magnetically conductive solenoid armature output member is configured to have a flux path extending through a major portion thereof and
said inertia-possessing load member is coupled to said solenoid armature output member adjacent said flux path
so that said inertia-possessing load member, which is separated from said magnetically conductive solenoid output member by said resilient coupling, conducts a portion of said magnetic flux generated by said electrical windings.

13. An impact-excited high-speed mechanism as in claim 12 wherein said resilient coupling is composed of a material having low magnetic reluctance with respect to air.

14. An impact-excited high-speed mechanism as in claim 13 wherein said resilient coupling having low magnetic reluctance with respect to air is composed of elastomeric material having particles of magnetic material dispersed therein.

15. An impact-excited high-speed mechanism as in claim 14 wherein said elastomeric material having particles of magnetic material dispersed therein is composed of rubber having particles of iron oxide dispersed therein.

16. An impact-excited high-speed mechanism as in claim 15 wherein said particles of magnetic material are particles of $Fe_3O_4$ iron oxide.

17. An impact-excited high-speed mechanism as in claim 16 wherein
said solenoid armature output member has low mechanical inertia and thereby a small magnetic cross section incapable of conducting the desired magnetic flux without saturation,
said rubber coupling member having $Fe_3O_4$ iron oxide particles dispersed therein being composed of rubber material capable of existing in a viscous, transfer-moldable state and capable of being cured into a state having a hardness near 90 on the Shore A durometer scale and
said $Fe_3O_4$ iron oxide particles having an acicular shape with a length less than 1 micron,
said rubber coupling member being formed to have a U-shaped cross section surrounding a portion of said inertia-possessing load member and being surrounded by said solenoid armature output member
so that force transmission between said inertia-possessing load member and said solenoid armature output member occurs primarily by way of shear forces along the sides of said U-shaped rubber coupling member,
said first and second bonding interface material having affinity for said elastomeric body portion is a nitrile rubber adhesive
so that said coupling member provides bonding and mechanical damping and magnetic permeability between said inertia-possessing load member and said solenoid armature output member.

18. Fatigue-resistant movable high-speed magnetic apparatus having low mechanical inertia and large magnetic flux conductivity, said apparatus comprising:

a first magnetically conductive movably mounted member of said high-speed magnetic apparatus, said first member inherently including a first quantity of mass, a first degree of structural resistance to impact-accelerated deformation and also including a region of magnetically limiting magnetic cross section area, said first member being magnetically coupled via air gap means with a magnetic excitation means;

a second magnetically conductive movably mounted member of said high-speed magnetic apparatus, said second member inherently including a second quantity of mass, a second degree of structural resistance to impact-accelerated deformation, different from said first degree of structural resistance in said first member, and also including means for mating with said first member adjacent said region of magnetically limiting magnetic cross section area; and a resilient magnetically conductive coupling member located between said first member region of magnetically limiting magnetic cross section area and said second member means for mating and connected by permanent attachment with each of said first and second members, said resilient magnetically conductive coupling member having a composition inclusive of an organic material body dispersed with particles of magnetically conductive material;

whereby said magnetically conductive coupling member reduces the flux-transmitting cross section area and the mass necessary in said first member by allowing supplemental flux conduction in said second member while also allowing small stress-relieving relative motion between said first and second members during impact acceleration of the first and second quantities of mass inherent in said members, thereby limiting fatigue-inducing deformation in said members of differing structural rigidity during said impact acceleration while yet transmitting the desired gross mechanical motion between said members.

19. Fatigue-resistant apparatus as in claim 18 wherein said organic material is a rubber compound and said particles of magnetically conductive material are iron oxide particles.

20. Fatigue-resistant apparatus as in claim 19 wherein said rubber compound includes acrylonitrile butadiene as a component.

21. Fatigue-resistant apparatus as in claim 19 wherein said rubber compound, including said particles of magnetically conductive material, has a post-curing hardness near 95 on the Shore A durometer scale.

22. Fatigue-resistant apparatus as in claim 18 wherein said resilient magnetically conductive coupling member includes rubber-to-metal bonding material means for attaching said organic material to said first and second magnetically conductive movably mounted members.

* * * * *